Nov. 29, 1960   A. B. FREDHOLD, JR., ET AL   2,962,322
HOOK MOUNTING
Filed Sept. 29, 1958
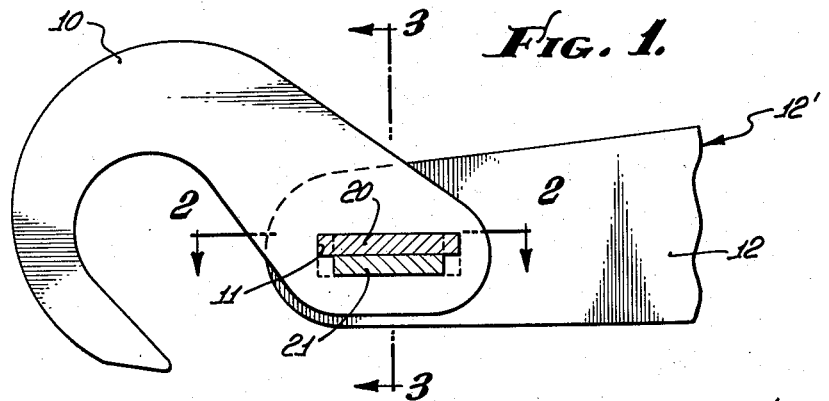
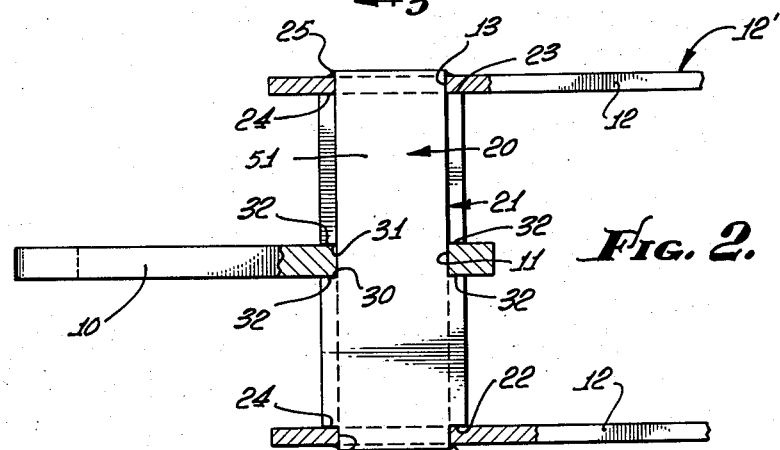
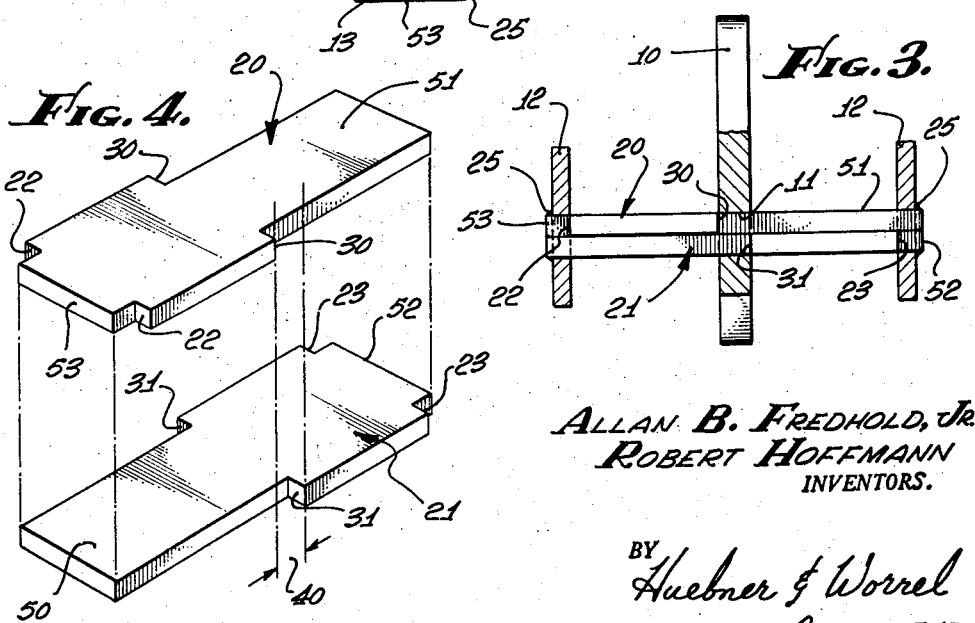
ALLAN B. FREDHOLD, JR.
ROBERT HOFFMANN
INVENTORS.
BY Huebner & Worrel
ATTORNEYS.

United States Patent Office 2,962,322
Patented Nov. 29, 1960

2,962,322
HOOK MOUNTING
Allan B. Fredhold, Jr., and Robert Hoffmann, Burbank, Calif., assignors to Aeroquip Corporation, Jackson, Mich., a corporation of Michigan
Filed Sept. 29, 1958, Ser. No. 763,865
7 Claims. (Cl. 294—82)

This invention relates to a two-beam mounting for a hook or other coupling device used to fasten a frame structure to a length of chain, strap or webbing, or to an anchor means.

In many industrial operations, and particularly in cargo handling, it is frequently desired to mount a hook or other coupling device on a frame structure, such as a buckle or a coupler, so that the frame structure or coupler may be attached to a length of chain or a strap or webbing, or may be securely fastened to an anchor means. The frame structure and the hook or other coupling device mounted thereon are often subject to heavy tension loads and distortions, and it is essential that the hook mounting be rigid and of substantial strength, but without excessive weight and bulk, and that the hook be firmly secured by the mounting to the frame structure.

For example, in cargo handling heavy tensions are often applied to the cargo binding chains, straps or webbing, and tension increasing and holding devices, frequently in the form of frame structures, are frequently used. It is necessary to secure these devices to the binding chains, straps or webbing or to anchor means on the cargo carrier, and the hooks or couplers used to so secure these devices and their mountings are thus also under heavy tension, and sometimes distortion, when the cargo is tightly bound against movement in transit. It is thus important to mount the hooks or couplers strongly, but it is also desirable to avoid excessive bulk and weight.

An object of this invention is to provide a mounting which will rigidly mount a hook or other coupling device on a frame structure and hold it in mounted position against severe tensions without distortion of the mounting.

Another object of the invention is to provide such a mounting which is easy and economical to manufacture and simple to install on a frame structure.

A further object of the invention is to provide such a mounting on which the hook or other coupling device may be quickly and easily rigidly mounted in a predetermined position.

Another object of the invention is to provide a hook or coupling mounting for a frame structure which will have substantial resistance to tension and distortion without excessive bulk.

It will be recognized that although the device described herein is a buckle or coupler used in cargo handling, and using a hook as the coupling device, nevertheless the invention is equally applicable to a mounting on any two-sided frame structure, and the coupling to be mounted is not limited to a hook but may be a bar, an eye, a ring, an angle, or any other coupling device or arrangement for attaching a frame structure to another structure or element or anchor means.

The invention also comprises novel details of construction and novel combinations and arrangements which will be apparent from the following description and drawings which, however, merely describe preferred embodiments of the present invention, as above suggested, and which are given for purposes of illustration and example only.

In the drawings:

Figure 1 is a side elevation of a hook mounted on a cut away frame structure, but with one side of the frame structure removed.

Figure 2 is a plan view, partly in section, taken on the line 2—2 of Figure 1.

Figure 3 is a transverse section taken on the line 3—3 of Figure 1.

Figure 4 is a perspective view of the beam elements of the mounting.

A hook 10 has an elongate slot 11 in the body thereof. Side members 12 of a body structure 12' also have elongate slots 13 arranged complementary to slot 11 in hook 10 when hook 10 is in a mounted position.

Stratified and tightly disposed in said slots 11 and 13 are flat beam elements 20 and 21, which are of the cruciform configuration best illustrated in Figure 4.

The beam elements 20 and 21 are formed with shoulders 22 and 23 respectively, which abut against inside surface lips 24 of the slots 13.

The stratified beam elements 20 and 21 span the distance between the side members 12 and extend through and slightly beyond the slots 13. When in full mounted position they are hammered down or swedged as at 25, or they may be otherwise rigidly held in position in said slots 13 by other suitable means, such as flanges, locknuts or clamps, or by welding, so that the beam elements 20 and 21 are rigidly mounted on the side members 12.

The beam elements 20 and 21 have a second pair of shoulders 30 and 31 respectively intermediate their ends. The shoulders 30 and 31 abut against opposite sides of the lips 32 of the slot 11 in hook 10. The complementary arrangement of the shoulders 30 and 31 to each other is such that the distance between the points illustrated by arrows at 40 in Figure 4 is approximately the same as, and minutely larger than, the thickness of hook 10, so that when the parts are arranged in final mounted position the hook 10 is firmly held against lateral movement in one direction by the shoulders 30 and against lateral movement in the opposite direction by shoulders 31.

To mount hook 10 on the frame structure 12', the narrow portion 50 of the body of the beam element 21 is inserted in slot 11 from one side of hook 10 until the shoulders 31 abut on one side of the lip 32 of slot 11. Narrow portion 51 of the beam element 20 is then inserted in slot 11 from the opposite direction and slid over the top of beam element 21 until the shoulders 30 abut against the opposite side of lip 32 of slot 11. In order to firmly mount hook 10 on beam elements 20 and 21 it is not only desirable that the distance between the points illustrated by arrows at 40 in Figure 4 be approximately the same as the thickness of hook 10, as hereinabove mentioned, but also that the width of the narrow portions 50 and 51 of beam elements 21 and 20 respectively approximate the width of slot 11, so that hook 10 will be rigidly mounted on the beeam elements 20 and 21, and firmly held against movement in any direction.

The assembly of hook 10 on the beam elements 20 and 21 is then rigidly mounted on the frame structure 12' by inserting the stratified beam elements 20 and 21 into slots 13 in the side members 12 of the body structure 12'. It will be understood that when the beam elements 20 and 21 are stratified, the narrow portion 51 of beam element 20 will lie directly over end 52 of beam element 21, and end 53 of beam element 20 will lie directly over the narrow portion 50 of beam element 21. In order to achieve a rigid mounting of the hook and beam assembly on the body frame structure it is desirable that the width of the narrow portion 51 of beam element 20 be approximately the same as the width of the end portion 52 of the beam element 21, and that the width of the end portion 53 of beam element 20 be approximately the same as the width of the narrow portion 50 of beam element 21, that said widths be substantially the same as the length of elongated slots 13, and that the combined stratified thickness of both beam elements be approximately the same as the width of elongated slots 13.

After the stratified beam elements 20 and 21 are thus inserted in slots 13, as above described, the ends thereof which protrude beyond the slots 13 are hammered, swedged or otherwise treated to rigidly mount said stratified beam elements in side members 12, and in cooperation with shoulders 22 and 23, to securely hold said stratified beam elements in said slots 13 against movement in any direction.

While the instant invention has been shown and described herein in what is conceived to be the most practical and preferred embodiments thereof, it will be recognized that departures may be made therefrom within the scope of the invention, which is therefore not to be limited to the details disclosed herein, but is to be accorded the full scope of the claims so as to embrace any and all equivalent devices.

Having thus described the invention, what we claim as new and desire to secure by Letters Patent is:

1. A device of the character described, comprising: a coupling having a shank portion; an elongated rectangular slot in said shank portion; a pair of identical, generally flat mounting beams disposed in said slot in overlying relationship to each other, the sum of the thickness of said beams being substantially equal to the lesser diameter of said slot; each of said beams having a slot penetrable section, the width of which is substantially equal to the greater diameter of said slot; and each of said slot penetrable sections terminating intermediate the ends of its beam at a pair of shoulders, said shoulders extending beyond the boundaries of said slot and abutting against said shank portion, the coupling and the beams being assembled with the shoulders of one beam abutting against one side of said shank portion and with the shoulders of the other beam abutting against the other side of said shank portion, so as to extend the slot penetrable sections of the beams oppositely in and through said slot.

2. A device as defined in claim 1, including a frame structure having parallel side members; an elongated rectangular slot in each of said side members of said frame structure, transversely aligned with each other and with said elongated rectangular slot in said shank portion; wherein said shank portion is disposed between said side members; and wherein the one outer extremity of the slot penetrable section of one beam and the opposite outer extremity of the other beam are tightly disposed in each of said elongated slots in the side members of said frame structure.

3. A device as defined in claim 2, wherein a pair of shoulders is formed adjacent to the opposite outer extremity of each of said other beams, said shoulders extending beyond the boundaries of the slot in each side member of said frame structure in which each said other beam is disposed so as to abut against said side member.

4. A device as defined in claim 3, wherein the sum of the thicknesses of the beams is substantially equal to the lesser diameter of the slot in each of the side members of the frame structure; the width of the outer extremity of the slot penetrable section of one beam is substantially equal to the width of the opposite outer extremity of the other beam; and the width of each of said extremities is substantially equal to the greater diameter of said rectangular slot in the side members of the frame structure.

5. A device of the character described, comprising: a coupling having a shank portion; an elongated rectangular slot in said shank portion; a frame structure having two parallel side members; an elongated rectangular slot in each of said side members, said elongated slots in the side members being of substantially the same proportion as, and being transversely aligned with the slot in the shank portion of the coupling; a pair of identical, generally flat mounting beams, disposed in said aligned slots in overlying relationship to each other, and the sum of the thicknesses of said beams being substantially equal to the lesser diameter of said aligned slots; each of said beams having a slot penetrable section, the width of which is substantially equal to the greater diameter of said aligned slots; each of said slot penetrable sections terminating intermediate the ends of its beam at a pair of shoulders, said shoulders extending beyond the boundaries of said slot in said shank portion and abutting against said shank portion; the coupling and the beams being assembled with the shoulders of one beam abutting one side of said shank portion and with the shoulders of the other beam abutting against the other side of said shank portion so as to extend the slot penetrable sections of the beams oppositely in and through said slot in said shank portion; and the outer extremity of the slot penetrable section of each beam and the opposite outer extremity of each other beam being tightly disposed in one of said elongated slots in one of said side members.

6. A device as defined in claim 5, wherein a pair of shoulders is formed adjacent to the opposite outer extremity of each of said other beams, said shoulders extending beyond the boundaries of the respective slot in each of said side members so as to abut against each of said side members.

7. A device as defined in claim 6, wherein the extreme outer extremity of each slot penetrable section of each beam and the extreme opposite extremity of each other beam are peened so as to abut against the outside surface of each of said side members and secure said beams in the slots in said side members.

References Cited in the file of this patent

UNITED STATES PATENTS

| | | |
|---|---|---|
| 2,553,133 | Conner | May 15, 1951 |
| 2,890,905 | Peters | June 16, 1959 |